US012567055B2

(12) United States Patent
Li et al.

(10) Patent No.: US 12,567,055 B2
(45) Date of Patent: Mar. 3, 2026

(54) METHOD FOR ORDERED EXECUTION OF CROSS-CHAIN TRANSACTIONS, AND CROSS-CHAIN SYSTEM

(71) Applicant: CHINA ACADEMY OF INFORMATION AND COMMUNICATIONS TECHNOLOGY, Beijing (CN)

(72) Inventors: Zhiping Li, Beijing (CN); Jiagui Xie, Beijing (CN); Jian Guo, Beijing (CN); Bo Zhang, Beijing (CN); Yuanchao Liu, Beijing (CN); Siyu Zhu, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 43 days.

(21) Appl. No.: 18/689,996

(22) PCT Filed: Jun. 6, 2022

(86) PCT No.: PCT/CN2022/097229
§ 371 (c)(1),
(2) Date: Mar. 7, 2024

(87) PCT Pub. No.: WO2023/040363
PCT Pub. Date: Mar. 23, 2023

(65) Prior Publication Data
US 2025/0131405 A1 Apr. 24, 2025

(30) Foreign Application Priority Data
Sep. 16, 2021 (CN) .......................... 202111084581.8

(51) Int. Cl.
*G06Q 20/30* (2012.01)

(52) U.S. Cl.
CPC ......... *G06Q 20/30* (2013.01); *G06Q 2220/00* (2013.01)

(58) Field of Classification Search
CPC .............. G06Q 20/30; G06Q 2220/00; G06Q 20/3829; G06Q 20/401; H04L 9/50
(Continued)

(56) References Cited

U.S. PATENT DOCUMENTS 10,785,232 B2 * 9/2020 Qiu ......................... H04L 67/55
11,126,683 B2 * 9/2021 Lu ........................ G06F 16/9566
(Continued)

FOREIGN PATENT DOCUMENTS

CN 111798316 A 10/2020
CN 112598514 A 4/2021
(Continued)

OTHER PUBLICATIONS

International Search Report of PCT/CN20222/097229 mailed Aug. 26, 2022, 6 pages.

*Primary Examiner* — Clifford B Madamba
(74) *Attorney, Agent, or Firm* — BROOKS KUSHMAN P.C.

(57) ABSTRACT

Embodiments of the disclosure disclose a method for orderly execution of cross-chain transactions and a cross-chain system. The method for orderly execution of cross-chain transactions includes: obtaining, by a main chain, a plurality of cross-chain transactions of a source chain; generating, by the main chain, a cross-chain transaction package for at least one of the plurality of subchains according to the plurality of cross-chain transactions, and distributing the cross-chain transaction package to the at least one subchain; and executing orderly, by the at least one subchain, the transactions in the cross-chain transaction package according to orders of the transactions in the cross-chain transaction package after (Continued)

obtaining the cross-chain transaction package. The embodiments of the disclosure may facilitate the orderly execution of cross-chain transactions.

11 Claims, 5 Drawing Sheets

(58) Field of Classification Search
USPC .......................................................... 705/35
See application file for complete search history.

(56) References Cited

U.S. PATENT DOCUMENTS

| | | | | |
|---|---|---|---|---|
| 11,797,988 B2 * | 10/2023 | Gu | ...................... | G06Q 20/4037 |
| 2019/0253252 A1 * | 8/2019 | Qiu | ........................ | H04L 9/3239 |
| 2019/0253263 A1 * | 8/2019 | Qiu | ........................ | H04L 63/102 |

FOREIGN PATENT DOCUMENTS

| | | | | |
|---|---|---|---|---|
| CN | 13537991 A | 10/2021 | | |
| WO | WO-2019211225 A1 * | 11/2019 | ............. | G06Q 20/06 |

* cited by examiner

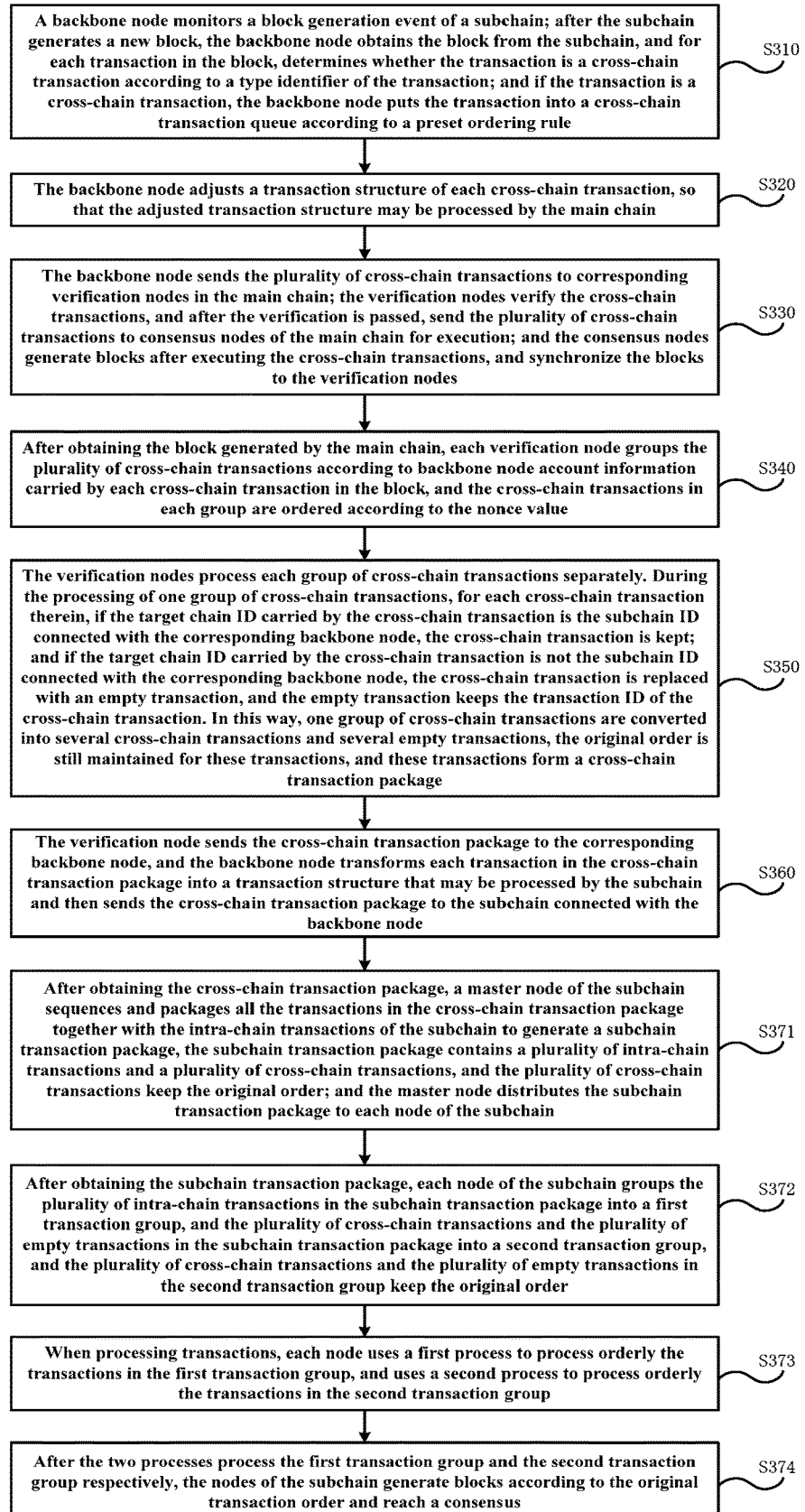

A backbone node monitors a block generation event of a subchain; after the subchain generates a new block, the backbone node obtains the block from the subchain, and for each transaction in the block, determines whether the transaction is a cross-chain transaction according to a type identifier of the transaction; and if the transaction is a cross-chain transaction, the backbone node puts the transaction into a cross-chain transaction queue according to a preset ordering rule — S310

The backbone node adjusts a transaction structure of each cross-chain transaction, so that the adjusted transaction structure may be processed by the main chain — S320

The backbone node sends the plurality of cross-chain transactions to corresponding verification nodes in the main chain; the verification nodes verify the cross-chain transactions, and after the verification is passed, send the plurality of cross-chain transactions to consensus nodes of the main chain for execution; and the consensus nodes generate blocks after executing the cross-chain transactions, and synchronize the blocks to the verification nodes — S330

After obtaining the block generated by the main chain, each verification node groups the plurality of cross-chain transactions according to backbone node account information carried by each cross-chain transaction in the block, and the cross-chain transactions in each group are ordered according to the nonce value — S340

The verification nodes process each group of cross-chain transactions separately. During the processing of one group of cross-chain transactions, for each cross-chain transaction therein, if the target chain ID carried by the cross-chain transaction is the subchain ID connected with the corresponding backbone node, the cross-chain transaction is kept; and if the target chain ID carried by the cross-chain transaction is not the subchain ID connected with the corresponding backbone node, the cross-chain transaction is replaced with an empty transaction, and the empty transaction keeps the transaction ID of the cross-chain transaction. In this way, one group of cross-chain transactions are converted into several cross-chain transactions and several empty transactions, the original order is still maintained for these transactions, and these transactions form a cross-chain transaction package — S350

The verification node sends the cross-chain transaction package to the corresponding backbone node, and the backbone node transforms each transaction in the cross-chain transaction package into a transaction structure that may be processed by the subchain and then sends the cross-chain transaction package to the subchain connected with the backbone node — S360

After obtaining the cross-chain transaction package, a master node of the subchain sequences and packages all the transactions in the cross-chain transaction package together with the intra-chain transactions of the subchain to generate a subchain transaction package, the subchain transaction package contains a plurality of intra-chain transactions and a plurality of cross-chain transactions, and the plurality of cross-chain transactions keep the original order; and the master node distributes the subchain transaction package to each node of the subchain — S371

After obtaining the subchain transaction package, each node of the subchain groups the plurality of intra-chain transactions in the subchain transaction package into a first transaction group, and the plurality of cross-chain transactions and the plurality of empty transactions in the subchain transaction package into a second transaction group, and the plurality of cross-chain transactions and the plurality of empty transactions in the second transaction group keep the original order — S372

When processing transactions, each node uses a first process to process orderly the transactions in the first transaction group, and uses a second process to process orderly the transactions in the second transaction group — S373

After the two processes process the first transaction group and the second transaction group respectively, the nodes of the subchain generate blocks according to the original transaction order and reach a consensus — S374

Fig. 3

Cross-chain transaction queue

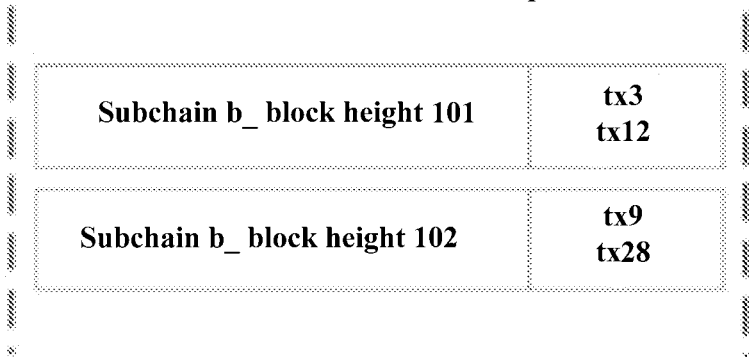

| Subchain b_ block height 101 | tx3 tx12 |
| Subchain b_ block height 102 | tx9 tx28 |

Fig. 4

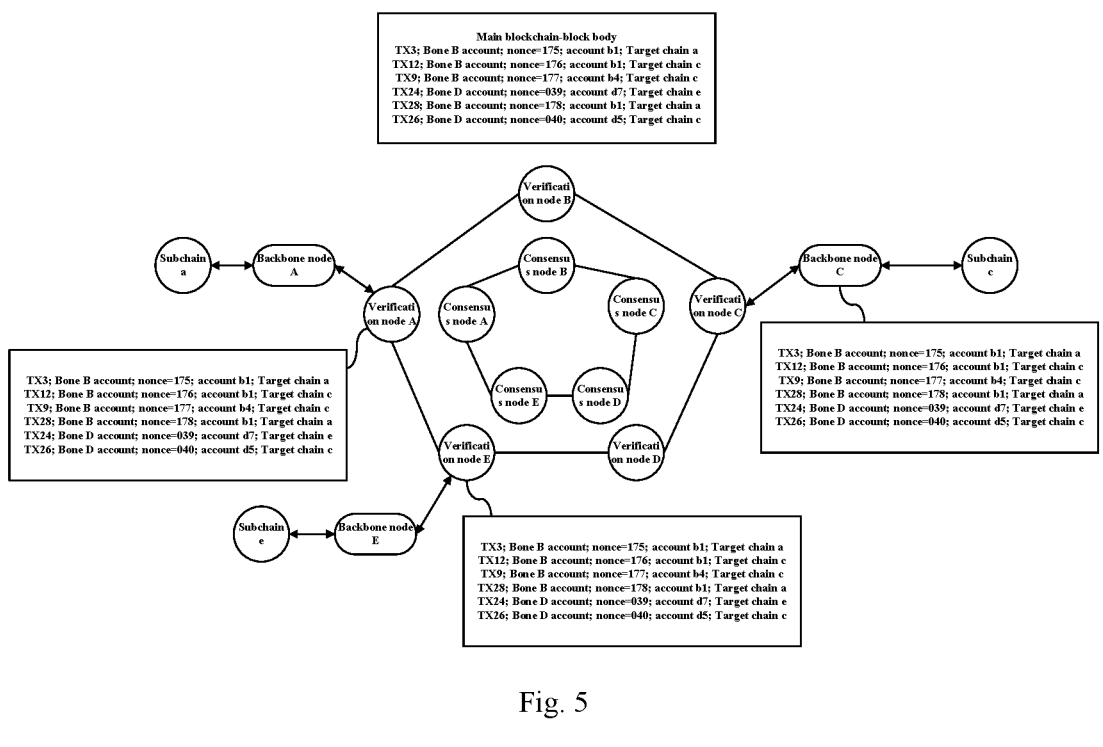

Fig. 5

Verification node A

---

Cross-chain transaction package

TX3: Bone B account; nonce=175; account b1; Target chain a

TX12 is an empty transaction, including the transaction ID of the original TX12

TX9 is an empty transaction, including the transaction ID of the original TX9

TX28: Bone B account; nonce=178; account b1; Target chain a

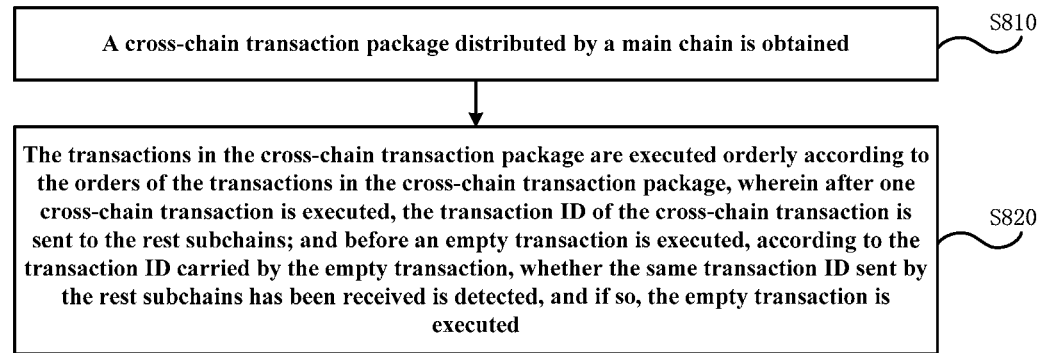

Cross-chain transaction package
TX3 is an empty transaction, including the transaction ID of the original TX3
<u>TX12: Bone B account; nonce=176; account b1; Target chain c</u>
<u>TX9: Bone B account; nonce=177; account b4; Target chain c</u>
TX28 is an empty transaction, including the transaction ID of the original TX28

Fig. 7

A cross-chain transaction package distributed by a main chain is obtained                    S810

The transactions in the cross-chain transaction package are executed orderly according to
the orders of the transactions in the cross-chain transaction package, wherein after one
cross-chain transaction is executed, the transaction ID of the cross-chain transaction is
sent to the rest subchains; and before an empty transaction is executed, according to the
transaction ID carried by the empty transaction, whether the same transaction ID sent by
the rest subchains has been received is detected, and if so, the empty transaction is
executed                    S820

METHOD FOR ORDERED EXECUTION OF CROSS-CHAIN TRANSACTIONS, AND CROSS-CHAIN SYSTEM

CROSS-REFERENCE TO RELATED APPLICATIONS

This application is a U.S. national phase of International Application No. PCT/CN2022/097229, filed on Jun. 6, 2022, which claims priority to Chinese Patent Application No. 202111084581.8, filed on Sep. 16, 2021, entitled "Methods for Orderly Execution of Cross-Chain Transactions and Cross-Chain Systems", the disclosures of which are hereby incorporated in their entirety by reference herein.

TECHNICAL FIELD

The disclosure relates to a technical field of blockchains, and for example relates to methods for orderly execution of cross-chain transactions and cross-chain systems.

BACKGROUND

As a distributed ledger, a blockchain has technical advantages for example in immutability of data information, traceability of data information, distributed decentralization, and a trustless system. The blockchain technology has been currently applied in many fields such as finance, health care, supply chains, asset management, Internet-based E-Commerce and so on.

SUMMARY

Embodiments of the disclosure disclose methods for orderly execution of cross-chain transactions, cross-chain systems, and corresponding apparatuses and media.

According to an aspect of the embodiments of the disclosure, disclosed is a method for orderly execution of cross-chain transactions, which is applied to a cross-chain system comprising a main chain and a plurality of subchains. The method for orderly execution of cross-chain transactions comprises:

obtaining, by the main chain, a plurality of cross-chain transactions of a source chain, at least one cross-chain transaction of the plurality of cross-chain transactions carrying a target chain identity (ID) and a transaction number, the transaction number indicating an execution order in the source chain for a cross-chain transaction to which the transaction number belongs, the source chain being one of the plurality of subchains, and a target chain corresponding to the target chain ID being a subchain other than the source chain in the plurality of subchains;

generating, by the main chain, a cross-chain transaction package for at least one subchain of the plurality of subchains according to the plurality of cross-chain transactions, and distributing the cross-chain transaction package to the at least one subchain, the cross-chain transaction package comprising at least one empty transaction and the at least one cross-chain transaction of the plurality of cross-chain transactions, the target chain ID carried by the cross-chain transaction in the cross-chain transaction package being same as a subchain ID of a subchain to which the cross-chain transaction package belongs, one empty transaction of the at least one empty transaction corresponding to one cross-chain transaction, the target chain ID carried by the cross-chain transaction corresponding to the at least one empty transaction being different from the subchain ID of the subchain to which the cross-chain transaction package belongs, the at least one empty transaction further carrying a transaction ID of the corresponding cross-chain transaction, and the at least one cross-chain transaction and the at least one empty transaction in the cross-chain transaction package being ordered according to the transaction number; and executing orderly, by the at least one subchain, transactions in the cross-chain transaction package according to orders of the transactions in the cross-chain transaction package after obtaining the cross-chain transaction package, wherein one of the at least one subchain sends, after executing a cross-chain transaction, the transaction ID of the executed cross-chain transaction to a rest of the at least one subchain, and wherein the one of the at least one subchain detects, according to the transaction ID carried by the empty transaction before executing the empty transaction, whether the one of the at least one subchain has received same transaction ID sent by other subchains, and executes the empty transaction in a case where the same transaction ID sent by the other subchains has been received;

wherein the executing orderly, by the at least one subchain, the transactions in the cross-chain transaction package according to the orders of the transactions in the cross-chain transaction package after obtaining the cross-chain transaction package comprises: receiving, by an ordering node of one of the at least one subchain, a plurality of intra-chain transactions submitted by other nodes of the at least one subchain, and receiving the cross-chain transaction package; packaging, by the ordering node of the one of the at least one subchain, the plurality of intra-chain transactions and the transactions in the cross-chain transaction package into a subchain transaction package, and distributing the subchain transaction package to at least one node in the at least one subchain; and grouping, by the at least one node, the plurality of intra-chain transactions in the subchain transaction package into a first transaction group, and the transactions of the cross-chain transaction package in the subchain transaction package into a second transaction group after obtaining the subchain transaction package, and processing the first transaction group and the second transaction group in parallel, the at least one node executing orderly the transactions according to orders of transactions in the second transaction group when processing the second transaction group.

According to another aspect of the embodiments of the disclosure, disclosed is a method for orderly execution of cross-chain transactions, which is applied to a target subchain in a cross-chain system comprising a main chain and a plurality of subchains, the target subchain being one subchain of the plurality of subchains. The method comprises:

obtaining a cross-chain transaction package distributed by the main chain, the cross-chain transaction package comprising at least one cross-chain transaction and at least one empty transaction, a target chain ID carried by the at least one cross-chain transaction being same as a subchain ID of the target subchain, each empty transaction of the at least one empty transaction corresponding to a cross-chain transaction respectively, the target chain ID carried by the cross-chain transaction corresponding to the at least one empty transaction being different from the subchain ID of the target subchain, the at least one empty transaction further carrying a transaction ID of the corresponding cross-chain transaction, the at least one cross-chain transaction and the at least one empty transaction in the cross-chain transaction package being ordered according to a transaction number, the transaction number indicating an execution order of the at least one cross-chain transaction in a source chain, and the source chain being a subchain of the plurality of subchains;

executing orderly the transactions in the cross-chain transaction package according to orders of the transactions in the cross-chain transaction package, wherein after one cross-chain transaction is executed, the transaction ID of the executed cross-chain transaction is sent to a rest of the plurality of subchains other than the target subchain; and wherein before the empty transaction is executed, whether a same transaction ID sent by the rest of the subchains has been received is detected according to the transaction ID carried by the empty transaction, and if so, the empty transaction is executed;

receiving, by an ordering node of the target subchain, a plurality of intra-chain transactions submitted by other nodes, and receiving the cross-chain transaction package distributed by the main chain; packaging, by the ordering node, the plurality of intra-chain transactions and the transactions in the cross-chain transaction package into a subchain transaction package, and distributing the subchain transaction package to at least one node of the target subchain; grouping, by the at least one node of the target subchain, the plurality of intra-chain transactions in the subchain transaction package into a first transaction group, and the transactions of the cross-chain transaction package in the subchain transaction package into a second transaction group, after obtaining the subchain transaction package, and processing the first transaction group and the second transaction group in parallel, the at least one node executing orderly the transactions according to orders of the transactions in the second transaction group when processing the second transaction group.

According to another aspect of the embodiments of the disclosure, disclosed is a cross-chain system comprising a main chain and a plurality of subchains, and cross-chain operations between the main chain and the plurality of subchains are based on operations of the method of any embodiment of the disclosure.

According to yet another aspect of the embodiments of the disclosure, disclosed is electronic apparatus comprising:

a memory configured to store executable instructions; and one or more processors configured to communicate with the memory to execute the executable instructions so as to performing operations of operations of the method of any embodiment of the disclosure.

According to still another aspect of the embodiments of the disclosure, disclosed is a computer-readable medium storing computer-readable instructions which, when being executed, perform operations of operations of the method of any embodiment of the disclosure.

Based on the method for orderly execution of cross-chain transactions and the cross-chain system disclosed by the above embodiments of the disclosure, a plurality of transactions in the cross-chain transaction package are ordered according to the transaction numbers, and execution orders of the plurality of transactions in the cross-chain transaction package in the source chain may be maintained. Moreover, during the orderly execution of the transactions in the cross-chain transaction package by the subchain, if the currently processed transaction is a cross-chain transaction, the subchain sends the transaction ID of the cross-chain transaction to the other subchains after processing the cross-chain transaction. If the currently processed transaction is an empty transaction, whether the subchain has received the same transaction ID sent by other subchains is detected according to the transaction ID carried by the empty transaction; if the same transaction ID sent by other subchains has been received, it means that the other subchains have processed the cross-chain transaction corresponding to the empty transaction, and subsequently, the subchain executes the empty transaction and executes the next transaction after executing the empty transaction. In this way, a plurality of cross-chain transactions in the source chain is executed by several subchains orderly according to the execution orders of these cross-chain transactions in a source subchain, which facilitates the orderly execution of cross-chain transactions.

The disclosure will be described in further detail with reference to the drawings and embodiments.

BRIEF DESCRIPTION OF THE DRAWINGS

The accompanying drawings, which form a part of the specification, illustrate embodiments of the disclosure, and together with the description, explain the principles of the disclosure.

The disclosure may be more clearly understood from the following detailed description with reference to the accompanying drawings. Obviously, the drawings in the following description are only some embodiments of the disclosure. For those of ordinary skilled in the art, other drawings may be obtained according to these drawings without creative labors.

FIG. 3 is a flowchart of a method for orderly execution of cross-chain transactions according to an embodiment of the disclosure;

FIG. 4 is a diagram of a backbone node ordering cross-chain transactions according to an embodiment of the disclosure;

FIG. 5 is a diagram of a verification node generating a cross-chain transaction package according to an embodiment of the disclosure;

FIG. 6 is a diagram of a verification node A generating a cross-chain transaction package according to an embodiment of the disclosure;

FIG. 7 is a diagram of a verification node C generating a cross-chain transaction package according to an embodiment of the disclosure; and FIG. 8 is a flowchart of a method for orderly execution of cross-chain transactions according to an embodiment of the disclosure.

DETAILED DESCRIPTION

Figure 1:
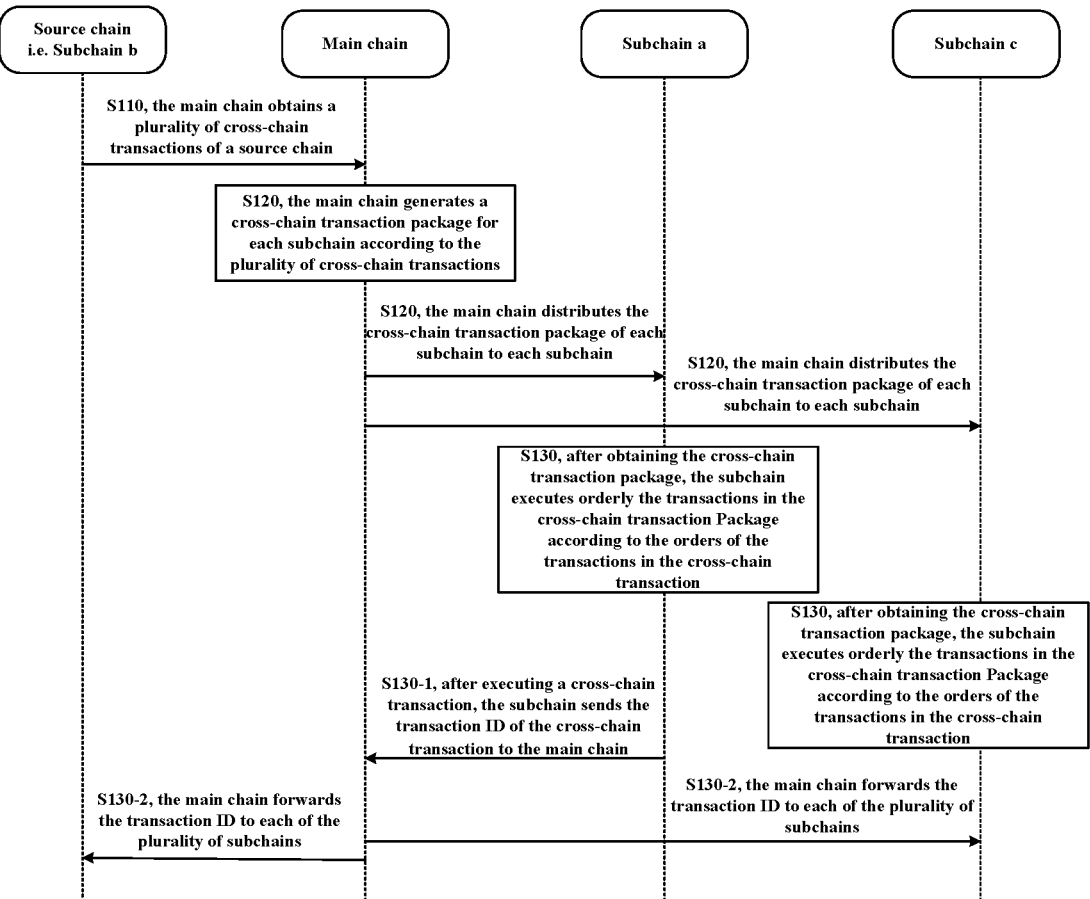
FIG. 1 is a flowchart of a method for orderly execution of cross-chain transactions according to an embodiment of the disclosure.

Various exemplary embodiments of the disclosure will now be described in detail with reference to the accompanying drawings. It is noted that the relative arrangements, numerical expressions and numerical values of components and operations set forth in these embodiments do not limit the scope of the disclosure unless otherwise specified.

It is also understood that, in the embodiments of the disclosure, "a plurality of" may refer to two or more, and "at least one" may refer to one, two, or more.

It may be understood by those skilled in the art that terms such as "first" and "second" in the embodiments of this disclosure are only used to distinguish different operations, devices or modules, and do not represent any specific technical meaning or their inevitable logical order.

It is also understood that any component, data or structure mentioned in the embodiments of the disclosure may generally be understood as one or more components, data or structures unless explicitly defined or given contrary enlightenment in the context.

It is also understood that the description of various embodiments in this disclosure focuses on the differences between various embodiments, and the same or similar parts may serve as references for each other, and will not be repeated for the sake of brevity.

The description of at least one exemplary embodiment below is only illustrative, and in no way should it be taken as any limitation on the disclosure, its application or uses.

Technologies, methods and apparatuses known to ordinary skilled in the art may not be discussed in detail, but in appropriate cases, they may be regarded as a part of the specification.

It is noted that similar reference numerals and letters indicate similar items in the following figures, so once an item is defined in one figure, it will not be further discussed in the following figures.

The embodiments of the disclosure may be applied to electronic apparatuses such as terminal apparatuses, computer systems, servers, and the like, which may be operated together with many other general-purpose or special-purpose computing system environments or configurations. Examples of terminal apparatuses, computing systems, environments and/or configurations suitable for use with terminal apparatuses, computer systems, servers and other electronic apparatuses include, but are not limited to, personal computer systems, server computer systems, thin clients, thick clients, handheld or laptop apparatuses, microprocessor-based systems, set-top boxes, programmable consumer electronics, network personal computers, small computer systems, mainframe computer systems, and distributed cloud computing technology environments including any of the above systems, and so on.

Terminal apparatuses, computer systems, servers and other electronic apparatuses may be described in the general context of computer system executable instructions (such as program modules) executed by computer systems. Generally, program modules may include routines, programs, object programs, components, logic, data structures, etc., which perform particular tasks or implement particular abstract data types. Computer systems/servers may be implemented in a distributed cloud computing environment where tasks are performed by remote processing apparatuses linked through a communication network. In the distributed cloud computing environment, program modules may be located on local or remote computing system storage media including storage apparatuses.

For example, due to complexity of cross-chain technologies and cross-chain systems, it is difficult to realize the orderly execution of cross-chain transactions, thus causing business problems. For example, a user registering in a subchain A initiates a cross-chain transaction tx1 and a cross-chain transaction tx2 successively during a period of time, hoping to purchase bond assets with a quantity m in subchain B through the cross-chain transaction tx1, and then to purchase fund assets with a quantity n in subchain C through the cross-chain transaction tx2 by utilizing the remaining assets in the account. However, when the total assets of account a1 are not enough to purchase both the bond assets with the quantity m and the fund assets with the quantity n, if the two cross-chain transactions are executed orderly, the bond assets that the user wants to buy the most may still be successfully purchased; however, if the two cross-chain transactions are not executed orderly, the bond assets that the user wants to buy the most may not be successfully purchased. It may be seen that the orderly execution of cross-chain transactions is important.

For example for the above issues, the embodiments of the disclosure disclose methods for orderly execution of cross-chain transactions, cross-chain systems, corresponding apparatuses and media. A plurality of transactions in a cross-chain transaction package are ordered according to the transaction numbers, and the execution orders in a source chain are maintained for the plurality of transactions in the cross-chain transaction package. Moreover, during the orderly execution of the transactions in the cross-chain transaction package by a subchain, if the currently processed transaction is a cross-chain transaction, the subchain may send a transaction ID of the processed cross-chain transaction to other subchains after processing the cross-chain transaction. If the currently processed transaction is an empty transaction, then according to a transaction ID carried by the empty transaction, whether the subchain has received the same transaction ID sent by the other subchains is detected; if so, it means that the other subchains have processed a cross-chain transaction corresponding to the empty transaction, then the subchain executes the empty transaction and executes the next transaction after executing the empty transaction. In this way, a plurality of cross-chain transactions in the source chain may be executed orderly by several subchains according to the execution orders of these cross-chain transactions in a source subchain, which facilitates the orderly execution of cross-chain transactions.

The technical solutions in the embodiments of the disclosure may be implemented in various computer languages, for example an object-oriented programming language, such as Java, and an interpreted scripting language, such as JavaScript.

In order to make the technical solutions and advantages of the embodiments of the disclosure clearer, exemplary embodiments of the disclosure will be described in detail below with reference to the attached drawings. Obviously, the described embodiments are only a part of the embodiments of the disclosure, but not an exhaustive list of all the embodiments. It is noted that the embodiments in the disclosure and the features in the embodiments may be combined with each other without conflicts.

Referring to FIG. 1, FIG. 1 is a flowchart of a method for orderly execution of cross-chain transactions according to an embodiment of the disclosure, the method for orderly execution of cross-chain transactions may be applied to a cross-chain system comprising a main chain and a plurality of subchains. As shown in FIG. 1, the method for orderly execution of cross-chain transactions may comprise the following operations.

In S110, the main chain may obtain a plurality of cross-chain transactions of a source chain.

Each cross-chain transaction carries a target chain ID and a transaction number, and the transaction number of each cross-chain transaction may indicate an execution order of the cross-chain transaction in the source chain, the source chain may be one of the plurality of subchains, and the target chain may be a subchain in the plurality of subchains other than the source chain.

In this disclosure, in addition to the target chain ID and the transaction number, each cross-chain transaction may further carry a transaction ID. The transaction number may indicate the execution order of the cross-chain transaction in the source chain. For example, the transaction numbers of the plurality of cross-chain transactions may be increment digital numbers. The larger the digital number of a cross-chain transaction, the lower the execution order of the cross-chain transaction in the source chain.

For ease of understanding, illustratively, let a cross-chain transaction carry information "tx_id:077ae2439; nonce:175; Account:b1; Source_chain_id:chain-b; Destination-_chain_id:chain-a", meaning that the transaction ID of the cross-chain transaction is 077ae2439, the transaction number of the cross-chain transaction is 175, the cross-chain transaction is initiated by the account b1, the source chain ID of the cross-chain transaction is chain-b, and the target chain ID of the cross-chain transaction is chain-a.

For another example, let a cross-chain transaction carry information "tx_id:8d69cbc53; nonce:176; Account:b1; Source_chain_id:chain-b; Destination_chain_id:chain-c", meaning that the transaction ID of the cross-chain transaction is 8d69cbc53, the transaction number of the cross-chain transaction is 176, the cross-chain transaction is initiated by the account b1, the source chain ID of the cross-chain transaction is chain-b, and the target chain ID of the cross-chain transaction is chain-c.

In some possible embodiments, the cross-chain system may further comprise a plurality of backbone nodes, each corresponding to a subchain, and a backbone node of the plurality of backbone nodes may connect the main chain and a subchain corresponding to the backbone node. In these embodiments, for example, obtaining, by the main chain, the plurality of cross-chain transactions of the source chain may comprise: obtaining, by a backbone node of the source chain, a plurality of cross-chain transactions of the source chain; and adjusting, by the backbone node, a transaction structure of at least one cross-chain transaction of the plurality of cross-chain transactions into a transaction structure matching the main chain, assigning a transaction number to at least one adjusted cross-chain transaction, and then submitting the plurality of cross-chain transactions with assigned transaction numbers to the main chain. In this way, the main chain may obtain the plurality of cross-chain transactions submitted by the backbone node.

In an optional example, S110 may be performed by the main chain in the cross-chain system.

In S120, the main chain may generate a cross-chain transaction package for at least one subchain of the plurality of subchains according to the plurality of cross-chain transactions, and may distribute the cross-chain transaction package to the at least one subchain.

The cross-chain transaction package of the at least one subchain may comprise at least one cross-chain transaction and at least one empty transaction. The target chain ID carried by the cross-chain transaction in the cross-chain transaction package of the at least one subchain may be the same as a subchain ID of the subchain. Each of the at least one empty transaction in the cross-chain transaction package of the at least one subchain may correspond to a cross-chain transaction, the target chain ID carried by the cross-chain transaction corresponding to the at least one empty transaction may be different from the subchain ID of the subchain, and the at least one empty transaction may further carry the transaction ID of the corresponding cross-chain transaction. The at least one cross-chain transaction and the at least one empty transaction in the cross-chain transaction package of each subchain may be ordered according to the transaction numbers.

In this disclosure, at least one cross-chain transaction and at least one empty transaction in the cross-chain transaction package of each subchain are ordered according to the transaction numbers, and thus the order of at least one transaction in the cross-chain transaction package of the at least one subchain may be the same as the execution order of at least one cross-chain transaction in the source chain.

In some possible embodiments, for example, distributing, by the main chain, the cross-chain transaction package of the at least one subchain to the at least one subchain may comprise: distributing, by the main chain, the cross-chain transaction package of the at least one subchain to backbone nodes of the at least one subchain; and adjusting, by a backbone node of a subchain of the at least one subchain, a transaction structure of each transaction in the cross-chain transaction package into a transaction structure matching the subchain, and submitting the adjusted cross-chain transaction package to the subchain.

It is noted that the cross-chain system of this disclosure may comprise a plurality of subchains, and in order to improve system compatibility, the plurality of subchains may be various heterogeneous chains, and the transaction structures supported by the plurality of subchains may be different. Therefore, in order to smoothly realize cross-chain operation among the plurality of subchains, before sending the cross-chain transaction of at least one subchain in this disclosure to the main chain, the backbone node of at least one subchain may adjust the transaction structure of the cross-chain transaction of the corresponding subchain, and then may send the adjusted cross-chain transaction to the main chain, so that the main chain may successfully execute the cross-chain transaction. Similarly, the backbone node of each subchain may also adjust the transaction structure of the cross-chain transaction sent by the main chain, and then send the adjusted cross-chain transaction to the corresponding subchain, so that the subchain may successfully execute the cross-chain transaction.

In an optional example, S120 may be performed by the main chain in the cross-chain system.

In S130, after obtaining the cross-chain transaction package, each subchain may execute orderly the transactions in the cross-chain transaction package according to the orders of the transactions in the cross-chain transaction package.

As shown in FIG. 1, after executing a cross-chain transaction, one subchain of the plurality of subchains sends the transaction ID of the executed cross-chain transaction to the rest of the plurality of subchains other than the subchain which has finished the execution of the cross-chain transaction. Before executing an empty transaction, the one subchain of the plurality of subchains detects whether the subchain has received the same transaction ID sent by other subchains according to the transaction ID carried by the empty transaction, and executes the empty transaction if the same transaction ID sent by the other subchains has been received. In addition, if the subchain has not received the same transaction ID sent by other subchains in the plurality of subchains than the subchain ready to execute the empty transaction, the subchain ready to execute the empty transaction may suspend the execution of the empty transaction until it receives the same transaction ID sent by the other subchains in the plurality of subchains than the subchain ready to execute the empty transaction.

In an optional example, S130 may be executed performed by the subchain in the cross-chain system.

In some possible embodiments, as shown in FIG. 1, after executing a cross-chain transaction, the subchain may send the transaction ID of the cross-chain transaction to the rest subchains in the following ways.

In S130-1, after executing the cross-chain transaction, the subchain may send the transaction ID of the cross-chain transaction to the main chain.

In an optional example, S130-1 may be performed by the subchain in the cross-chain system.

In S130-2, after receiving the transaction ID, the main chain may forward the transaction ID to at least one subchain of the plurality of subchains, for example, the transaction ID may be forwarded to each subchain of the plurality of subchains.

In an optional example, S130-2 may be performed by the main chain in the cross-chain system.

In the disclosure, the transaction ID may be forwarded to at least one subchain in the cross-chain system through the main chain, for example, to all subchains in the cross-chain system through the main chain, and thus the at least one subchain does not need to save and update a routing relationship among the subchains at any time, which simplifies the design of the subchains and reduces the workload of subchain calculation.

In an implementation, the main chain may comprise a plurality of main chain nodes, and at least one main chain node may correspond to a subchain, for example, each main chain node corresponds to a subchain. When a subchain finishes executing a cross-chain transaction, the subchain may send the transaction ID of the cross-chain transaction to the backbone node of the subchain. The backbone node may submit the transaction ID to the main chain node corresponding to the subchain. After receiving the transaction ID, the main chain node synchronizes the transaction ID to other main chain nodes of the main chain through a peer to peer (P2P) network of the main chain. After receiving the transaction ID, each of the other main chain nodes may send the transaction ID to the backbone node of the subchain corresponding to each main chain node. After receiving the transaction ID sent by the main chain node, each backbone node may send the transaction ID to the corresponding subchain. After receiving the transaction ID, the subchain may perform synchronization within the subchain through the P2P network of the subchain, so that each subchain node receives the transaction ID.

In another possible embodiment, at least one subchain in the cross-chain system may save and update the routing relationship among the subchains, for example, each subchain in the cross-chain system may save and update the routing relationship between the subchains. When a subchain in the cross-chain system finishes executing a cross-chain transaction, the subchain may directly send the transaction ID of the cross-chain transaction to the other subchains according to the routing relationship among the subchains.

In some possible embodiments, at least one subchain in the cross-chain system may execute cross-chain transactions, for example, each subchain in the cross-chain system may further execute a plurality of intra-chain transactions in addition to the cross-chain transactions, so as to improve an overall execution efficiency of transactions by the subchains in the cross-chain system. In this disclosure, the subchain in the cross-chain system may package the intra-chain transactions and cross-chain transactions into the same transaction package (hereinafter referred to as a subchain transaction package) for processing, which, for example, may include the following operations.

An ordering node of at least one subchain may receive a plurality of intra-chain transactions submitted by other nodes of the subchain, for example, the ordering node of each subchain in the cross-chain system may receive a plurality of intra-chain transactions submitted by the other nodes of the subchain and may receive a cross-chain transaction package distributed by the main chain. The ordering node of the at least one subchain may package the plurality of intra-chain transactions and the transactions in the cross-chain transaction package into a subchain transaction package and may distribute the subchain transaction package to at least one node in the subchain. After obtaining the subchain transaction package, the at least one node may group the plurality of intra-chain transactions in the subchain transaction package into a first transaction group, and the transactions of the cross-chain transaction package in the subchain transaction package into a second transaction group, and may process the first transaction group and the second transaction group in parallel.

When the at least one node processes the second transaction group, for example, when each subchain node in the cross-chain system processes the second transaction group, the subchain node may execute orderly the transactions in the second transaction group according to the orders of the transactions in the second transaction group. For example, as mentioned above, after executing a cross-chain transaction, the transaction ID of the executed cross-chain transaction may be sent to the rest subchains. Before executing an empty transaction, according to the transaction ID carried by the empty transaction, whether the same transaction ID sent by other subchains has been received may be detected, and the empty transaction may be executed if the same transaction ID sent by other subchains has been received. In addition, if the same transaction ID sent by other subchains has not been received, the execution of the empty transaction may be suspended until the same transaction ID sent by other subchains is received.

In this disclosure, by grouping the intra-chain transactions in a subchain transaction package into the first transaction group grouping the cross-chain transactions and empty transactions in the subchain transaction package into the second transaction group, and processing the two transaction groups in parallel by the subchain in the cross-chain system, the execution of the intra-chain transactions may not be affected by the empty transactions. For example, although during executing an empty transaction, the subchain node may enter a waiting period in a case where the subchain node has not received the same transaction ID sent by other subchains in the cross-chain system than the subchain which is executing the empty transaction, and thus the execution of the cross-chain transaction subsequent to the empty transaction may be affected, the intra-chain transactions in the first transaction group may not be affected and may still be executed, which in turn improves the overall execution efficiency of transactions by the subchains. In this disclosure, after both the first transaction group and the second transaction group have been executed, the subchain executing both the first transaction group and the second transaction group may generate a block and may reach a consensus on the block.

Based on the method for orderly execution of cross-chain transactions in the embodiments of the disclosure, the plurality of transactions in the cross-chain transaction package may be ordered according to the transaction numbers, and the execution orders of the plurality of transactions may be maintained for the cross-chain transaction package in the source chain. Moreover, during the orderly execution of the transactions in the cross-chain transaction package by a subchain in the cross-chain system, if the currently processed transaction is a cross-chain transaction, the subchain may send the transaction ID of the cross-chain transaction to other subchains after processing the cross-chain transaction. If the currently processed transaction is an empty transaction, according to the transaction ID carried by the empty transaction, whether the subchain has received the same transaction ID sent by other subchains in the cross-chain system than the subchain may be detected, and if the same transaction ID sent by other subchains has been received by the subchain, it means that the other subchains have processed the cross-chain transaction corresponding to the empty transaction, and then the subchain may execute the empty transaction, and may execute the next transaction after executing the empty transaction. If the same transaction ID sent by other subchains has not been received by the subchain, it means that the other subchains have not processed the cross-chain transaction corresponding to the empty transaction yet, and thus the subchain may wait until the same transaction ID sent by other subchains is received, and then the subchain may execute the empty transaction, and may execute the next transaction afterwards. In this way, a plurality of cross-chain transactions in the source chain may be executed by the subchains successively according to the execution orders of these cross-chain transactions in a source subchain, which facilitates the orderly execution of cross-chain transactions.

Figure 2:
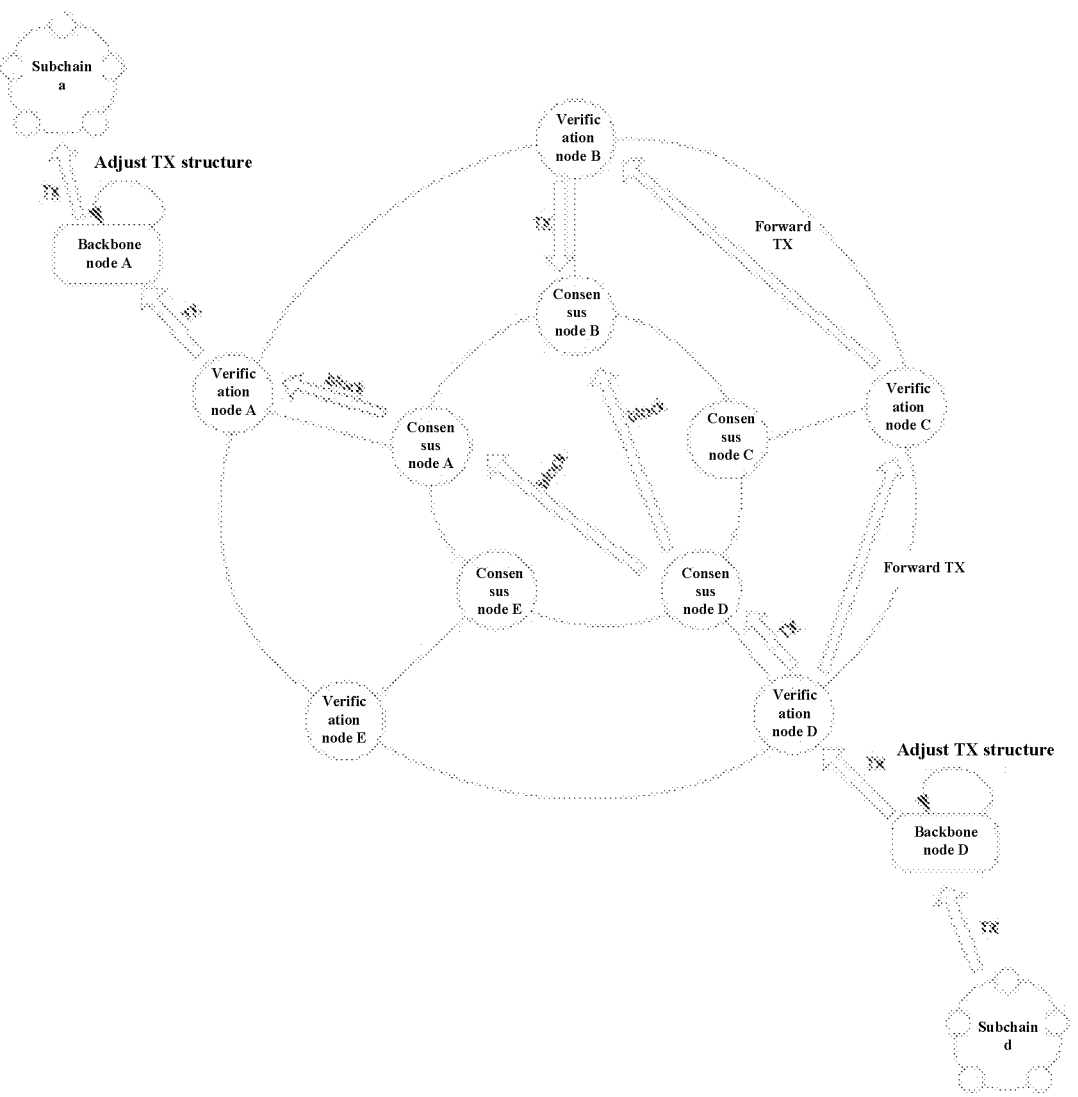
FIG. 2 is a diagram of a cross-chain system according to an embodiment of the disclosure.

Referring to FIG. 2, FIG. 2 is a diagram of a cross-chain system according to an embodiment of the disclosure, the cross-chain system may comprise a main chain, a plurality of subchains, and a plurality of backbone nodes, wherein at least one backbone node may correspond to a subchain, for example, each backbone node may correspond to a subchain, and each backbone node may connect the main chain and the subchain corresponding to the backbone node.

The backbone node may be configured as a cross-chain gateway, and the backbone node may be configure with a built-in cross-chain account (that is, an account registered in the main chain) which is configured to communicate message between the subchain and the main chain. The main chain may be oriented to subchains of multiple domains, to realize data circulation of the subchains of multiple domains.

As shown in FIG. 2, a cross-chain process based on the cross-chain system may comprise the following operations.

In S210, the backbone node may obtain a cross-chain transaction TX of a subchain, verify the cross-chain transaction TX of the subchain, adjust the cross-chain transaction TX into a transaction structure supported by the main chain, and send it to the main chain.

In an optional example, S210 may be performed by the backbone node in the cross-chain system.

In S220, after forwarding, executing and verifying the cross-chain transaction TX among verification nodes of the main chain, the cross-chain transaction TX may be submitted to a consensus node of the main chain.

In an optional example, S220 may be performed by the main chain in the cross-chain system.

In S230, the consensus node of the main chain may perform packaging, consensus and putting on blockchain on the cross-chain transaction TX, thereby generating a block recording a plurality of cross-chain transactions TX.

In an optional example, S230 may be performed by the main chain in the cross-chain system.

In S240, the verification node of the main chain may obtain the block generated by the consensus node, read the cross-chain transactions TX from the block, and for each cross-chain transaction TX, inform a target chain of a corresponding backbone node according to a target chain ID carried by the cross-chain transaction TX.

In an optional example, S240 may be performed by the main chain in the cross-chain system.

In S250, the backbone node may adjust the cross-chain transaction TX into a transaction structure supported by the corresponding subchain, and route the adjusted cross-chain transaction TX to the corresponding subchain.

In an optional example, S250 may be performed by the backbone node in the cross-chain system.

In S260, after obtaining the cross-chain transaction TX, the subchain may verify a signature of the cross-chain transaction TX, and execute the cross-chain transaction TX after the verification is passed.

In an optional example, S260 may be performed by the subchain in the cross-chain system.

FIG. 2 shows the cross-chain operation flow disclosed in this disclosure. In order to realize the orderliness of cross-chain transactions, the cross-chain system may perform the cross-chain operation steps shown in FIG. 1 during the cross-chain operation.

The method for orderly execution of cross-chain transactions and the cross-chain system were introduced above in combination with some embodiments. The method for orderly execution of cross-chain transactions will be explained in further detail below in combination with another embodiments.

Referring to FIG. 3, FIG. 3 is a flowchart of a method for orderly execution of cross-chain transactions according to an embodiment of the disclosure. As shown in FIG. 3, the method may comprise the following operations.

In S310, a backbone node may monitor a block generation event of a subchain; after the subchain generates a new block, the backbone node may obtain the block from the subchain, and for each transaction in the block, determine whether the transaction is a cross-chain transaction according to a type identifier of the transaction; if the transaction is a cross-chain transaction, the backbone node may put the transaction into a cross-chain transaction queue according to a preset ordering rule.

In this disclosure, for a plurality of cross-chain transactions, the backbone node may arrange these cross-chain transactions into the cross-chain transaction queue according to execution orders of the plurality of cross-chain transactions in the subchain.

For ease of understanding, as shown in FIG. 4, the backbone node may obtain two blocks of the subchain during a period of time, a block with a block height of 101 in the subchain b and a block with a block height of 102 in the subchain b. Each block may include several cross-chain transactions. For example, the block with the block height of 101 in the subchain b may include cross-chain transactions such as tx3 and tx12, and the block with the block height of 102 in the subchain b may include cross-chain transactions such as tx9 and tx28.

When the plurality of cross-chain transactions is ordered according to the preset sequencing rule, the blocks are ordered according to the block heights in an ascending order, and then the plurality of cross-chain transactions in each block are ordered according to the original orders in the block. In this way, a final order of the plurality of cross-chain transactions shown in FIG. 4 may be tx3, tx12, tx9, tx28.

In an optional example, S310 may be performed by the backbone node in the cross-chain system.

In S320, the backbone node may adjust a transaction structure of each cross-chain transaction, so that the adjusted transaction structure may be a processable transaction structure by the main chain.

In an implementation, the backbone node may have a registered cross-chain account (that is, the account of the backbone node in the main chain), and the cross-chain account of the backbone node may be used for assigning a nonce value to the cross-chain account (the nonce value in this disclosure may be the transaction number). The backbone node may adjust, in a preset adjustment manner, the transaction structure of each cross-chain transaction into a transaction structure that may be processed by the main chain. Then, a nonce value may be assigned successively. Every time the backbone node assigns a nonce value, the nonce value increases automatically by 1.

For ease of understanding, it is assumed that the nonce value is 175 before the backbone node assigns a nonce value to tx3, and the backbone node may assign a transaction number 175 to tx3. Then, the nonce value increases automatically by 1 and becomes 176, and the backbone node may assign a nonce value 176 to tx12. Then, the nonce value of the backbone node increases automatically by 1 and becomes 177, and the backbone node may assign a transaction number 2757 to tx9. Then, the nonce value of the backbone node increases automatically by 1 and becomes 178, and the backbone node may assign a transaction number 178 to tx28. Finally, the backbone node assigns different nonce values to the plurality of cross-chain transactions successively, and the nonce values of the plurality of cross-chain transactions increase successively.

In an optional example, S320 may be performed by the backbone node in the cross-chain system.

In S330, the backbone node may send the plurality of cross-chain transactions to verification nodes corresponding to the plurality of cross-chain transactions in the main chain; the verification nodes may verify the cross-chain transactions, and send the plurality of cross-chain transactions to consensus nodes of the main chain for execution after the verification is passed; and the consensus nodes may generate blocks after executing the cross-chain transactions, and may synchronize the blocks to the verification nodes.

In this disclosure, as shown in FIG. 2, the main chain may comprise a plurality of verification nodes and a plurality of consensus nodes, wherein each verification node may correspond to a subchain and a backbone node, and the plurality of verification nodes may be connected with the plurality of consensus nodes. The backbone node may send a plurality of cross-chain transactions to the verification node corresponding to the backbone node.

In an optional example, S330 may be performed by the backbone node in the cross-chain system.

In S340, after obtaining the block generated by the main chain, each verification node may group the plurality of cross-chain transactions according to backbone node account information carried by each cross-chain transaction in the block, and the cross-chain transactions in each group may be ordered according to the nonce value.

For ease of understanding, as shown in FIG. 5, a new block generated by the main chain may comprise six cross-chain transactions tx1 to tx6, wherein each cross-chain transaction may record information such as backbone node account information, a nonce value, personal account information and a target chain ID. Take tx1 as an example, wherein "bone B account" means that tx1 carries the account information of backbone node B, in other words, tx1 is a cross-chain transaction sent by backbone node B to the main chain; "nonce=175" means that the nonce value of tx1 is 175; "personal account b1" means that tx1 was initiated by personal account b1 on the subchain of backbone node B at first; and "target chain a" means that tx1 needs to be sent to subchain a connected with backbone node A.

In an optional example, S340 may be performed by the main chain in the cross-chain system.

As shown in FIG. 3, taking the verification node A as an example, after the verification node A obtains the new block generated by the main chain, the verification node A may divide the six cross-chain transactions in the new block into two groups according to the backbone node account information, one group including cross-chain transactions of the "bone B account" and the other group including cross-chain transactions of the "bone D account". In each group of cross-chain transactions, the plurality of cross-chain transactions may be ordered according to the nonce value in an ascending order.

In S350, the verification nodes may process each group of cross-chain transactions separately. During the processing of a group of cross-chain transactions by the verification nodes, for each cross-chain transaction in the group, if the target chain ID carried by the cross-chain transaction is the subchain ID connected with the corresponding backbone node, the cross-chain transaction is kept; if the target chain ID carried by the cross-chain transaction is not the subchain ID connected with the corresponding backbone node, the cross-chain transaction is replaced with an empty transaction, and the empty transaction keeps the transaction ID of the cross-chain transaction. In this way, a group of cross-chain transactions may be converted into several cross-chain transactions and several empty transactions, original orders may be maintained for these transactions, and these transactions may form a cross-chain transaction package.

For ease of understanding, as shown in FIG. 5, taking the verification node A as an example, with respect to a group of cross-chain transactions corresponding to the "bone B account" (including TX3, TX12, TX9 and TX28), for TX3, the target chain ID carried by TX3 is a and the target chain a is the subchain connected with the backbone node A corresponding to the verification node A, and thus the cross-chain transaction TX3 is kept.

For TX12, the target chain ID carried by TX12 is c and the target chain c is not the subchain connected with the backbone node A corresponding to the verification node A, and thus TX12 is replaced with an empty transaction, and the empty transaction keeps the transaction ID of TX12.

Then for TX9, the target chain ID carried by TX9 is c and the target chain c is not the subchain connected with the backbone node A corresponding to the verification node A, and thus TX9 is replaced with an empty transaction, and the empty transaction keeps the transaction ID of TX9.

Then for TX28, the target chain ID carried by TX28 is a and the target chain a happens to be the subchain connected with the backbone node A corresponding to the verification node A, and thus the cross-chain transaction TX28 is kept.

Thus, the verification node A generates the cross-chain transaction package as shown in FIG. 6, and the verification node C generates the cross-chain transaction package as shown in FIG. 7. In addition, the verification node C and the verification node E also generate cross-chain transaction packages for a group of cross-chain transactions of the "bone D account", which will not be described in detail here for the sake of simplification.

In an optional example, S350 may be performed by the main chain in the cross-chain system.

In S360, the verification node may send the cross-chain transaction package to the corresponding backbone node, the backbone node may transform each transaction in the cross-chain transaction package into a transaction structure that may be processed by the subchain, and then send the cross-chain transaction package to the subchain connected with the backbone node.

For the subchain, the processing of the transaction by the subchain may comprise the following operations.

In S371, after obtaining the cross-chain transaction package, a master node of the subchain may order and package all transactions in the cross-chain transaction package together with the intra-chain transactions of the subchain to generate a subchain transaction package, the subchain transaction package including a plurality of intra-chain transactions and a plurality of cross-chain transactions, the plurality of cross-chain transactions keeping the original orders; and the master node may distribute the subchain transaction package to each node of the subchain.

In an optional example, S371 may be performed by the subchain in the cross-chain system.

In S372, after obtaining the subchain transaction package, each node of the subchain may group the plurality of intra-chain transactions in the subchain transaction package into a first transaction group, and the plurality of cross-chain transactions and the plurality of empty transactions in the subchain transaction package into a second transaction group, and the plurality of cross-chain transactions and the plurality of empty transactions in the second transaction group keep the original orders.

In an optional example, S372 may be performed by the subchain in the cross-chain system.

In S373, when processing transactions, each node may use a first process to process orderly the transactions in the first transaction group, and use a second process to process orderly the transactions in the second transaction group.

In an optional example, S373 may be performed by the subchain in the cross-chain system.

During the transactions in the second transaction group are processed orderly according to the second process, if the currently processed transaction is a cross-chain transaction, the second process may directly execute the cross-chain transaction and send the transaction ID of the cross-chain transaction to the master node after processing the cross-chain transaction. When the master node receives the transaction ID sent by most nodes (for example, 60% nodes), the master node may send the transaction ID to the backbone node, so that the transaction ID may be routed to other subchains via the backbone node and the main chain for buffering.

If the currently processed transaction is an empty transaction, the second process may attempt to read the transaction ID of the empty transaction from a buffer. If the second process reads the transaction ID, it means that the other subchains have finished processing the cross-chain transaction corresponding to the empty transaction. In this case, the second process may execute the empty transaction (for example, may directly update an execution status of the empty transaction to be "executed"), and then process the next transaction after executing the empty transaction. If the second process failed to read the transaction ID, it means that the other subchains have not yet finished processing the cross-chain transaction corresponding to the empty transaction. In this case, the second process may wait until the corresponding transaction ID is stored in the buffer. In this way, a plurality of cross-chain transaction from the same subchain may be executed orderly according to the transaction numbers even in a case where the cross-chain transactions are executed on different subchains.

For ease of understanding, for example, with reference to FIGS. 6 and 7, after executing the cross-chain transaction TX3, the subchain a sends the transaction ID of the cross-chain transaction TX3 to the other subchains. The subchain c executes the empty transaction TX3 after receiving the transaction ID of the cross-chain transaction TX3. The subchain c executes the cross-chain transaction TX12 after executing the empty transaction TX3. After executing the cross-chain transaction TX12, the subchain c sends the transaction ID of the cross-chain transaction TX12 to the other subchains. The subchain c then executes the cross-chain transaction TX9. After executing the cross-chain transaction TX9, the subchain c sends the transaction ID of the cross-chain transaction TX9 to the other subchains. The subchain a executes the empty transaction TX12 after receiving the transaction ID of the cross-chain transaction TX12. The subchain a executes the empty transaction TX9 after executing the empty transaction TX12 and receiving the transaction ID of the cross-chain transaction TX9. The subchain a executes the cross-chain transaction TX28 after executing the empty transaction TX9. After executing the cross-chain transaction TX28, the subchain a sends the transaction ID of the cross-chain transaction TX28 to the other subchains. The subchain c executes the empty transaction TX28 after receiving the transaction ID of the cross-chain transaction TX28.

In the above process, the cross-chain transaction TX3, the cross-chain transaction TX12, the cross-chain transaction TX9 and the cross-chain transaction TX28 are executed orderly in the subchain a and the subchain c. In other words, the cross-chain transaction TX12 is executed by the subchain c after the cross-chain transaction TX3 is executed by the subchain a; the cross-chain transaction TX9 is executed by the subchain c only after the cross-chain transaction TX12 is executed by the subchain c, and the cross-chain transaction TX28 is executed by the subchain a after the cross-chain transaction TX9 is executed by the subchain c.

In S374, after the first transaction group and the second transaction group are processed respectively by the two processes, the nodes of the subchain may generate blocks according to the original transaction orders and reach a consensus.

In an optional example, S374 may be performed by the subchain in the cross-chain system.

Some examples of the methods for orderly execution of cross-chain transactions, which may be applied to a whole cross-chain system, are described above in combination with some embodiments. Examples of methods for orderly execution of cross-chain transactions, which may be applied to a subchain, will be described below in combination with another embodiments. The above embodiments may be referred to for some example implementations of the methods for orderly execution of cross-chain transactions, which may be applied to a subchain. To avoid repetitions, the methods for orderly execution of cross-chain transactions, which may be applied to a subchain, will be described briefly below.

Referring to FIG. 8, FIG. 8 is a flowchart of a method for orderly execution of cross-chain transactions according to an embodiment of the disclosure, and the method for orderly execution of cross-chain transactions may be applied to a subchain in a cross-chain system. As shown in FIG. 8, the method may comprise the following operations.

In S810, a cross-chain transaction package distributed by a main chain may be obtained.

The cross-chain transaction package may include at least one cross-chain transaction and at least one empty transaction, a target chain ID carried by the at least one cross-chain transaction may be the same as a subchain ID of a target subchain, each of the at least one empty transaction may correspond to a cross-chain transaction, the target chain ID carried by the cross-chain transaction corresponding to the at least one empty transaction may be different from the subchain ID of the target subchain, and the at least one empty transaction may also carry a transaction ID of the corresponding cross-chain transaction. The at least one cross-chain transaction and the at least one empty transaction in the cross-chain transaction package of each subchain may be ordered according to the transaction numbers, the transaction number may indicate an execution order of each cross-chain transaction in a source chain, and the source chain may be one subchain of the plurality of subchains.

In an optional example, S810 may be performed by the subchain in the cross-chain system.

In S820, the transactions in the cross-chain transaction package may be executed orderly according to the orders of the transactions in the cross-chain transaction package, wherein after one cross-chain transaction is executed, the transaction ID of the executed cross-chain transaction may be sent to the rest subchains; before an empty transaction is executed, according to the transaction ID carried by the empty transaction, whether the same transaction ID sent by the rest of the subchains has been received may be detected, and if so, the empty transaction may be executed.

In an optional example, S820 may be performed by the subchain in the cross-chain system.

In some possible embodiments, if the same transaction ID sent by other subchains has not been received, the execution of the empty transaction may be suspended until the same transaction ID sent by other subchains is received.

In some possible embodiments, the obtaining, by the target subchain, the cross-chain transaction package distributed by the main chain and executing orderly, by the target subchain, the transactions in the cross-chain transaction package according to the orders of the transactions in the cross-chain transaction package may comprise:

receiving, by an ordering node of the target subchain, a plurality of intra-chain transactions submitted by other nodes of the target subchain, and receiving the cross-chain transaction package distributed by the main chain; packaging, by the ordering node of the target subchain, the plurality of intra-chain transactions and the transactions in the cross-chain transaction package into a subchain transaction package, and distributing the subchain transaction package to at least one node of the target subchain; and grouping, by the at least one node of the target subchain, the plurality of intra-chain transactions in the subchain transaction package into a first transaction group, and the transactions of the cross-chain transaction package in the subchain transaction package into a second transaction group after obtaining the subchain transaction package, and processing the first transaction group and the second transaction group in parallel, the at least one node executing orderly the transactions according to the orders of the transactions in the second transaction group when processing the second transaction group.

In some possible embodiments, the sending, by the target subchain, the transaction ID of the executed cross-chain transaction to the other subchains may comprise: after executing a cross-chain transaction, sending the transaction ID of the executed cross-chain transaction to the main chain, so that the main chain forwards the transaction ID to at least one subchain of the plurality of subchains.

It is understood by those skilled in the art that the embodiments of the disclosure may be implemented as methods, systems, or computer program products. Therefore, the disclosure may be in a form of an entirely hardware embodiment, an entirely software embodiment, or an embodiment combining software and hardware aspects. Furthermore, the disclosure may be in a form of a computer program product implemented on one or more computer usable storage media (including but not limited to magnetic disk memory, CD-ROM, optical memory, etc.) having computer usable program code embodied therein.

The disclosure has been described with reference to flowcharts and/or block diagrams of the method, apparatus (system), and computer program product according to the embodiments of the disclosure. It is understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce an apparatus configured to implement the functions described in one or more flows in the flowcharts and/or one or more blocks in the block diagrams.

These computer program instructions may also be stored in a computer-readable memory which may direct a computer or other programmable data processing apparatus to function in certain manner, such that the instructions stored in the computer-readable memory produce an article of manufacture including an instruction device which implements the functions described in one or more flows in the flowcharts and/or one or more blocks in the block diagrams.

These computer program instructions may also be loaded onto a computer or other programmable data processing apparatus such that a series of operations are performed on the computer or other programmable apparatus to produce a computer implemented process, such that the instructions executed on the computer or other programmable apparatus provide operations for implementing the functions described in one or more flows in the flowcharts and/or one or more blocks in the block diagrams.

What is claimed is:

1. A method for orderly execution of cross-chain transactions, the method being applied to a cross-chain system comprising a main chain and a plurality of subchains, and the method for orderly execution of cross-chain transactions comprising:

obtaining, by the main chain, a plurality of cross-chain transactions of a source chain, wherein at least one cross-chain transaction of the plurality of cross-chain transactions carrying a target chain ID and a transaction number, the transaction number indicating an execution order in the source chain for a cross-chain transaction to which the transaction number belongs, transaction numbers of the plurality of cross-chain transactions are gradually increasing digital numbers, the greater a digital number of a cross-chain transaction of the plurality of cross-chain transactions, the later the execution order of the cross-chain transaction in the source chain, the source chain being one of the plurality of subchains, and a target chain corresponding to the target chain ID being a subchain other than the source chain in the plurality of subchains;

generating, by the main chain, a cross-chain transaction package for at least one subchain of the plurality of subchains according to the plurality of cross-chain transactions, and distributing the cross-chain transaction package to the at least one subchain, the cross-chain transaction package comprising at least one empty transaction and the at least one cross-chain transaction of the plurality of cross-chain transactions, the target chain ID carried by the cross-chain transaction in the cross-chain transaction package being same as a subchain ID of a subchain to which the cross-chain transaction package belongs, one empty transaction of the at least one empty transaction corresponding to one cross-chain transaction, the target chain ID carried by the cross-chain transaction corresponding to the at least one empty transaction being different from the subchain ID of the subchain to which the cross-chain transaction package belongs, the at least one empty transaction further carrying a transaction ID of the corresponding cross-chain transaction, and the at least one cross-chain transaction and the at least one empty transaction in the cross-chain transaction package being ordered according to the transaction number; and executing orderly, by the at least one subchain, transactions in the cross-chain transaction package according to orders of the transactions in the cross-chain transaction package after obtaining the cross-chain transaction package, wherein one of the at least one subchain sends, after executing a cross-chain transaction, the transaction ID of the executed cross-chain transaction to a rest of the at least one subchain, and wherein the one of the at least one subchain detects, according to the transaction ID carried by the empty transaction before executing the empty transaction, whether the one of the at least one subchain has received same transaction ID sent by other subchains, and executes the empty transaction in a case where the same transaction ID sent by the other subchains has been received;

wherein the executing orderly, by the at least one subchain, the transactions in the cross-chain transaction package according to the order of the transactions in the cross-chain transaction package after obtaining the cross-chain transaction package comprises: receiving, by an ordering node of one of the at least one subchain, a plurality of intra-chain transactions submitted by other nodes of the at least one subchain, and receiving the cross-chain transaction package; packaging, by the ordering node of one of the at least one subchain, the plurality of intra-chain transactions and the transactions in the cross-chain transaction package into a subchain transaction package, and distributing the subchain transaction package to at least one node in the at least one subchain; and grouping, by the at least one node, the plurality of intra-chain transactions in the subchain transaction package into a first transaction group, and the transactions of the cross-chain transaction package in the subchain transaction package into a second transaction group after obtaining the subchain transaction package, and processing the first transaction group and the second transaction group in parallel, the at least one node executing orderly the transactions according to the order of the transactions in the second transaction group when processing the second transaction group;

wherein the sending, by the one subchain of the at least one subchain, the transaction ID of the executed cross-chain transaction to the rest of the at least one subchain after executing a cross-chain transaction comprises: after executing a cross-chain transaction, sending, by the one subchain of the at least one subchain, the transaction ID of the executed cross-chain transaction to the main chain, so that the main chain forwards the transaction ID to at least one of the plurality of subchains, to help to simplify design of the at least one subchain and reduce workload of subchain calculation;

the cross-chain system further comprises a plurality of backbone nodes, one of the plurality of backbone nodes corresponds to a subchain, and one of the plurality of backbone nodes is configured to connect the main chain and the subchain corresponding to one of the plurality of backbone nodes;

the main chain comprises a plurality of main chain nodes, and at least one main chain node of the plurality of main chain nodes corresponds to the subchain;

after executing a cross-chain transaction, sending, by the one subchain of the at least one subchain, the transaction ID of the executed cross-chain transaction to the main chain, so that the main chain forwards the transaction ID to at least one of the plurality of subchains comprises:

when a certain subchain finishes executing a cross-chain transaction, the subchain sending the transaction ID of the cross-chain transaction to the backbone node of the subchain; the backbone node submitting the transaction ID to the main chain node corresponding to the subchain;

after receiving the transaction ID, the main chain node synchronizing the transaction ID to other main chain nodes of the main chain through a peer-to-peer (P2P) network of the main chain; after receiving the transaction ID, each of the other main chain nodes sending the transaction ID to the backbone node of the subchain corresponding to the each of the other main chain nodes; after receiving the transaction ID sent by the each of the other main chain nodes, the backbone node sending the transaction ID to a corresponding subchain; after receiving the transaction ID, the corresponding subchain performing synchronization within the subchain through a P2P network of the corresponding subchain, so that each subchain node receives the transaction ID, thus helping to simplify the design of the at least one subchain and reducing the workload of subchain calculation.

2. The method of claim 1, further comprising:

in a case where the same transaction ID sent by other subchains has not been received by the one subchain of the at least one subchain, suspending, by the one subchain of the at least one subchain, an execution of the empty transaction until the same transaction ID sent by other subchains is received.

3. The method of claim 1, wherein the obtaining, by the main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

4. The method of claim 2, wherein the obtaining, by main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

5. The method of claim 1, wherein the obtaining, by main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

6. A cross-chain system, comprising a main chain and a plurality of subchains, cross-chain operations between the main chain and the plurality of subchains being performed according to operations of the method of claim 1.

7. The cross-chain system of claim 6 wherein in a case where the same transaction ID sent by other subchains has not been received by the one subchain of the at least one subchain, the one subchain of the at least one subchain suspends an execution of the empty transaction until the same transaction ID sent by other subchains is received.

8. The cross-chain system of claim 6 wherein the sending, by the one subchain of the at least one subchain, the transaction ID of the executed cross-chain transaction to the rest of the at least one subchain after executing a cross-chain transaction comprises:

after executing a cross-chain transaction, sending, by the one subchain of the at least one subchain, the transaction ID of the executed cross-chain transaction to the main chain, so that the main chain forwards the transaction ID to at least one of the plurality of subchains.

9. The cross-chain system of claim 6 wherein the obtaining, by the main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

10. The cross-chain system of claim 7 wherein the obtaining, by the main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

11. The cross-chain system of claim 8 wherein the obtaining, by the main chain, the plurality of cross-chain transactions of the source chain comprises:

obtaining, by a backbone node of the source chain, a plurality of cross-chain transactions of the source chain; adjusting a transaction structure of at least one of the plurality of cross-chain transactions into a transaction structure matching the main chain; assigning a transaction number to at least one adjusted cross-chain transaction; and then submitting a plurality of cross-chain transactions with assigned transaction numbers to the main chain; and wherein the distributing, by the main chain, the cross-chain transaction package to the at least one subchain comprises:

distributing, by the main chain, the cross-chain transaction package to backbone nodes of the at least one subchain; and adjusting, by the backbone node of the at least one subchain, a transaction structure of at least one transaction in the cross-chain transaction package into a transaction structure matching the at least one subchain, and submitting the adjusted cross-chain transaction package to the at least one subchain.

\* \* \* \* \*